Aug. 14, 1962     F. C. GENOVESE, JR     3,049,619
DIFFERENTIAL CERENKOV COUNTER
Filed Dec. 19, 1958
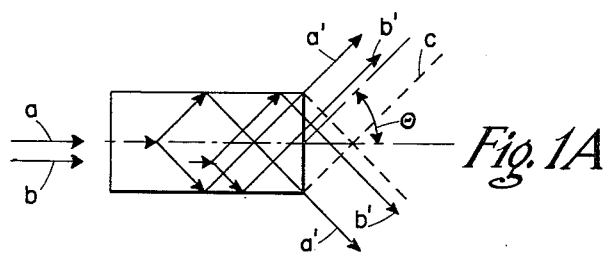
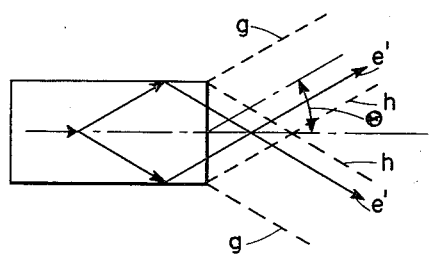
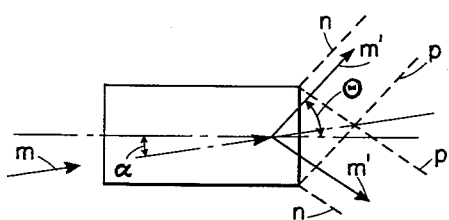
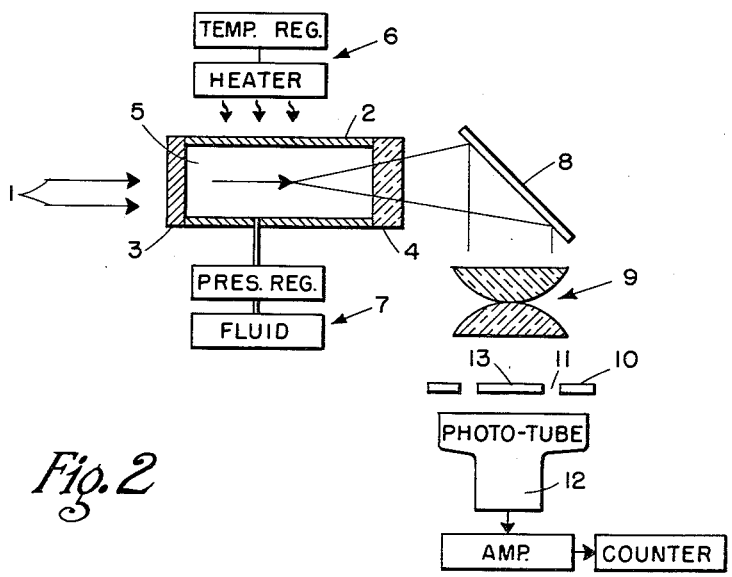
INVENTOR.
Frank C. Genovese, Jr.
BY United States Patent Office 3,049,619
Patented Aug. 14, 1962

3,049,619
DIFFERENTIAL CERENKOV COUNTER
Frank C. Genovese, Jr., Brookline, Mass., assignor, by mesne assignments, to the United States of America as represented by the Secretary of the Navy
Filed Dec. 19, 1958, Ser. No. 781,820
13 Claims. (Cl. 250—71.5)

The present invention relates generally to apparatus for detecting and counting charged subatomic particles and more particularly, to a light-sensitive counter which detects Cerenkov radiation.

When high speed charged particles having a velocity $\beta$ equal to $$\frac{V}{c}$$

pass into a nonabsorbing dielectric, their velocity is unaltered except for collision and radiative losses. However, the electric field associated with the particle's charge and the magnetic field associated with its motion are propagated with a phase velocity of only $$\frac{1}{n}$$

where $n$ is the index of refraction of the dielectric medium. The resulting electromagnetic radiation is canceled by destructive interference in all directions if $\beta n$ is less than 1; however, if $\beta n$ is greater than 1, there is one direction at an angle $\theta$, whose $$\text{cosine} = \frac{1}{\beta n}$$

with the path of the particle in which constructive interference creates coherent radiation.

If the dielectric material is water, glass, mica or plastic, for example, this cone-shaped coherent radiation will occur in the visual portion of the spectrum. Thus, in its simplest construction, a Cerenkov counter may take the form of a transparent dielectric member whose interior walls are silvered or otherwise made reflective to direct all of the light flashes produced as a result of the above phenomenon onto the cathode of a sensitive photomultiplier. Counters of this sort have found particular application in the study of mesons, positive rays and high-energy photons. One of their useful characteristics is their exceptionally short resolving times since the light flash from a single charged particle usually lasts less than one billionth of a second.

Because the Cerenkov radiation in a given medium occurs only when the speed of the charged particles is greater than the velocity of light in that medium, these counters can be used as threshold detectors to register only those particles whose speed or energy exceeds a certain value. Furthermore, since the angle between the direction of light emission and the path of the initiating particles depend on the velocity of the latter, they can be adapted to determine charged particle velocities or energies. For example, particles of different mass can be distinguished in two ways: first, for the same velocity, that is, the same Cerenkov angle, the brightness of the flash as indicated by the magnitude of the output pulse from the photomultiplier is proportional to the square of the charge on the particle; and, second, for the same energy the velocity will be different. In one common type of Cerenkov counter of the prior art, the radiator is simply a solid cone of Lucite having its apex angle equal to the above angle $\theta$. If an electron enters this cone at its apex and travels along its altitude, all of the emergent light will be in a parallel beam. A condensing lens with a diaphragm in its focal plane completes the optical assembly and the aperture of the latter element prevents any light emitted at angles different from $\theta$ from reaching the photosensitive cathode of the photomultiplier tube.

Counters of this general configuration, however, have relatively small apertures because of their poor off-axis sensitivity. That is, particles traveling parallel to, but off this axis of symmetry of the radiator, may miss being counted, the more so their displacement is from this axis. Consequently, it is necessary to place a collimator in front of the radiator in order to direct and restrict the cross-sectional area of the entrant beam.

Another characteristic of these counters which limits their utilization is their inability to velocity analyze beams of charged particles. This is a result of the requirement that the geometry of the radiator be fixed for a particular particle velocity; that is, the apex angle $\theta$, once selected, cannot be altered. Neither, for that matter, can the radiator's index of refraction be modified to accomplish the same result.

It is accordingly a primary object of the present invention to provide a light-sensitive counter for velocity analyzing a high energy particle beam.

A further object of the present invention is to provide a differential Cerenkov counter which can operate with an entrant beam of relatively large cross-sectional area.

A still further object of the present invention is to provide a Cerenkov counter which can detect and count charged particles of different velocities.

A still further object of the present invention is to provide a high speed subatomic particle detector having a relatively large input aperture.

A still further object of the present invention is to provide a Cerenkov counter which will detect charged particles moving parallel to, but off the axis of symmetry of the dielectric radiator.

Other objects and many of the attendant advantages of this invention will be readily appreciated as the same becomes better understood by reference to the following detailed description when considered in connection with the accompanying drawings wherein:

FIGS. 1A, 1B and 1C illustrate the optical characteristics of Cerenkov radiation; and FIG. 2 schematically illustrates a differential Cerenkov counter constructed according to the present invention.

As mentioned hereinbefore, the wave front of the Cerenkov light is cone-shaped and occurs at a particular angle $\theta$ with respect to the direction of motion of the charged particle. A portion of the wave front, therefore, can be pictured as light from a star, i.e., a very remote source, in a plane determined by this portion of the wave front and the path of the particle. In this manner, the Cerenkov light may be considered as coming from a ring of stars, the mean angular radius of which is $\theta$. If the total Cerenkov light is focused by an optical system, one therefore gets a ring focus just as if one focused light from a ring of stars. Thus, if the charged particles move parallel to the axis of a mirrored cylinder of refractive material, then particles with the same velocity will form a ring image of the same radius about a common point independently of their point of passage with respect to this axis. This may be seen from a study of FIG. 1A wherein charged particles "$a$" and "$b$" proceeding along and parallel to the axis of symmetry, respectively, produce external light cones "$a'$" and "$b'$," both of which are centered about the above axis. It will be also seen from examination of this figure that all particles moving parallel to the axis of symmetry will form hollow light cones which will fall within the limits determined by boundary rays "$a'$" and "$c$," which rays extend from the extremities of the cylinder at an angle $\theta$ as measured from the horizontal. The median cone of this group will have a radius angle equal to $\theta$ and a plane perpendicular to the axis of symmetry of the cylinder will intersect these cones in a circular ring as mentioned hereinbefore. The above result occurs because the reflection of the light rays does not change the angle the light makes with the axis of the cylinder. However, this is true for only those particles which are moving parallel to this axis. The case where the charged particle is moving along the axis of symmetry but with a velocity less than that of particle "$a$" in FIG. 1A is shown in FIG. 1B. Since the cosine of $\theta$ is equal to $$\frac{1}{\beta n}$$

particle "$e$" will produce a light cone "$e'$" of smaller radius angle than that of FIG. 1A. However, all the emergent light cones will still be symmetrical about the longitudinal axis of the cylinder and be included within the limits set by boundary rays "$g$" and "$h$." Thus, particles moving in the proper direction but with the wrong velocity will be focused in rings having radii either larger or smaller than corresponding rings of FIG. 1A.

Particles not moving parallel to the symmetrical axis will appear as a ring focus centered with respect to their direction of motion, provided their light is unreflected by the internal walls of the cylinder. Such a condition is shown in FIG. 1C where particle "$m$," moving at an angle $\alpha$ with respect to the longitudinal axis, produces light cone "$m'$" centered about the particle direction. The limits of all the cones forming the ring are shown by boundary rays "$n$" and "$p$." In this case, a plane perpendicular to the longitudinal axis of the cylinder will intersect these cones in an eliptical ring instead of the circular ring of FIG. 1A and FIG. 1B.

If reflections are involved in the latter case, it can be shown that the emergent light cones will neither be symmetrical about the longitudinal axis of the cylinder or the direction of travel of the charged particle. The boundary rays, such as "$g$" and "$h$" in FIG. 1B, in this instance, are not parallel but depart from this relationship by the angle $\alpha$ which, as mentioned above, is the angle the path of the particle makes with the longitudinal axis of the cylinder. In this case also, an intersecting plane such as the one shown in FIG. 1A will produce an elliptical ring.

The details of a differential counter which makes use of these features of the Cerenkov light are schematically illustrated in FIG. 2. Here, a collimated stream of charged particles which is to be velocity analyzed, for example, is directed as shown by arrows 1 into a stainless steel cylinder 2 whose inside surface is polished to a mirror finish. A thin aluminum window 3 which is transparent to these particles seals one end of the cylinder, while a relatively thick glass window 4 which is transparent to Cerenkov light seals the other end. Confined within this cylinder is a fluid 5 which is kept near its critical pressure and temperature by means of a temperature-controlled heater 6 and a pressure controlled fluid source 7. This fluid, whose characteristics will be hereinafter identified, performs as a radiator of variable index of refraction. That is, by changing its density, its index of refraction can be increased from a value slightly greater than one up to a maximum value corresponding to its liquid phase. A front surface mirror 8 is disposed at an angle to the axis of symmetry of the cylinder and directs the emergent light energy to a pair of wide angle lenses 9. A diaphragm 10 having a ring-shaped aperture 11 is located in the focal plane of these lenses in front of the photosensitive cathode of a photomultiplier tube 12.

The operation of this apparatus is as follows: A charged particle moving either along or parallel to the axis of symmetry of cylinder 2 will produce an elliptical ring image on the face of inclined mirror 8 for the reason previously discussed. However, lens system 9, whose optical axis is at the same angle to the plane of this mirror as the axis of the cylinder, views this elliptical ring as a cylindrical ring and brings it to focus through aperture 11 onto the photosensitive cathode of the photomultiplier 12. Thus, all Cerenkov light from particles moving in the proper direction and with the correct speed reach the pickup tube 12.

In contradistinction to this, particles moving in the proper direction but at the wrong velocity will have their light focused in rings of larger or smaller radii than aperture 11 and, thus, fail to activate pickup tube 12. Also, particles that do not move along the proper direction will likewise be discriminated against by the ring aperture 11 since they will not have their ring focus centered about the midpoint 13 of the diaphragm member 11. Furthermore, these particles will usually produce an elliptical ring focus which will not match the circular ring aperture of diaphragm 10. If the last-mentioned particles produce light reflections in the cylinder, then here, too, only a small fraction of the elliptical light will pass through the above aperture to the photosensitive cathode of the multiplier tube 12. It will thus be seen that the above counter will have maximum efficiency for particles moving in the proper direction at the proper velocity and will effectively discriminate against all other particles.

In order to keep the geometry of the above system constant and still achieve variable velocity selection, a radiator with a continuously variable index of refraction is needed. Such a radiator, as mentioned hereinbefore, is a gas near its critical pressure and temperature for in its gaseous phase it will have its lowest index of refraction, while in its liquid phase it will have its maximum index of refraction. It would be pointed out that if the geometry of the counter can be maintained fixed, the Cerenkov light intensity will remain constant independent of the index of refraction, for the intensity is proportional to $\sin^2 \theta$. The realization of a constant light intensity is highly desirable since the various electronic bias settings of the amplifying circuits associated with the photo-electric tube need not be changed when the system is counting particles of different velocities. This means, of course, that the calibration procedure is extremely simple.

In one particular embodiment of the present invention, the fluid was fluorochemical, "FC–75." This gas was chosen because of its low critical pressure and temperature, $P_C$ being 232 lbs./sq. in. and $T_C$, 270° C. Its index of refraction was continuously varied from $n=1.01$ to $1.15$ at a temperature of 250° C. by changing the pressure. Other gases which can be used are the freons and carbon dioxide. It would be pointed out, however, that the substance used as the radiator preferably should have the following characteristics: it should have as low an atomic number as possible in order to have low stopping power for the charged particles, thereby allowing them to penetrate a reasonable distance into the radiator; it should be transparent; and it should have homogeneous optical qualities.

It should be appreciated that the differential characteristic of the counter just described is due to the presence of the ring-shaped aperture in diaphragm 9 and that this counter can be changed to operate, for example, as a threshold device by replacing the above diaphragm with a solid disk of a diameter corresponding to the minimum velocity.

It should also be recognized that mirror 8 of FIG. 2 is employed solely for the purpose of diminishing the over-all length dimension of the optical portion of the counter and that it could be eliminated and the optical lenses placed in front of the cylinder, if desired.

Obviously many modifications and variations of the present invention are possible in the light of the above teachings. It is therefore to be understood that within the scope of the appended claims the invention may be practiced otherwise than as specifically described.

What is claimed is:

1. In a Cerenkov counter of the type wherein a beam of charged particles is directed into a transparent dielectric so as to produce coherent radiation at a given angle with respect to the direction of motion of those particles whose speeds exceed that of light in said dielectric, the improvement of utilizing as said dielectric a volume of fluid which is bounded by a cylindrical reflective wall surface, the pressure and temperature of said fluid being adjustable for converting said fluid from its gaseous to its liquid phase.

2. In a Cerenkov counter of the type wherein a stream of charged particles is directed into a transparent dielectric so as to produce coherent radiation at a predetermined angle with respect to the direction of motion of those particles whose velocities exceed a predetermined value, the improvement of utilizing as the dielectric a tubular member whose internal surface has a high coefficient of reflection and a transparent fluid confined within this tubular member and kept near its critical temperature and pressure so as to be readily susceptible of transitions from its gaseous to its liquid phase and vice versa.

3. A charged particle detector comprising, in combination, a volume of transparent fluid, said volume being bound by a cylindrical wall surface having a high coefficient of reflection, means for varying the index of refraction of said transparent fluid by changing its temperature and/or pressure, means for directing the charged particles which are to be detected into said volume along and parallel to its axis of symmetry whereby the Cerenkov light produced by those particles whose velocities in said fluid exceed that of light within said fluid emerges from said volume as a plurality of concentric cones centered about said axis of symmetry and a light sensitive means for measuring the intensity of preselected groups of said cone.

4. A charged particle detector comprising, in combination, a cylinder, said cylinder containing a transparent dielectric in the form of a gaseous substance, said cylinder having its wall surface adapted to internally reflect light energy impinging thereon, means for varying the temperature and pressure of said gaseous substance thereby to vary the index of refraction of said transparent dielectric, means for directing the particles to be detected into said cylinder whereby all particles moving parallel to the longitudinal axis of said cylinder and with a velocity exceeding that of light in said dielectric produce external light cones which are symmetrically disposed about said axis, a photomultiplier tube, and means for permitting light from only those cones whose diameters fall within a predetermined range to illuminate the photosensitive cathode of said photomultiplier tube.

5. The method of velocity analyzing a stream of high speed charged particles which comprises the steps of directing said stream into a cylindrical volume of transparent fluid so as to produce concentric Cerenkov light cones from those particles which are moving in parallel directions at velocities greater than that of light in said fluid, the diameter of each cone being related to the velocity of the charged particle producing it and successively changing the index of refraction of said fluid so as to form cones of equal diameters from particles of different velocities and measuring the intensity of said light cones at each different index of refraction.

6. A differential Cerenkov counter comprising, in combination, a gaseous volume of dielectric material, said dielectric material being transparent to light energy and being bounded by a highly reflective cylindrical wall surface, means for varying the temperature and pressure of said gaseous volume thereby to alter its index of refraction, means for directing a charged particle beam into said volume whereby all of those particles thereof whose velocities in said dielectric exceed that of light in said dielectric and whose directions of motion are parallel to the longitudinal axis of said cylindrical volume form concentric light cones disposed about said axis, a photomultiplier tube, and means for permitting light from those cones whose diameters fall within a given upper and lower limit to reach the photosensitive cathode of said photomultiplier tubes.

7. In a differential Cerenkov counter as set forth in claim 6 wherein said means for permitting light from those cones whose diameters fall within said upper and lower limit to reach the photosensitive cathode of said photomultiplier tube includes a diaphragm having a ring-shaped aperture positioned in front of said photosensitive cathode, the inner and outer diameter of said ring aperture corresponding to said lower and upper limits, respectively.

8. A differential Cerenkov counter comprising, in combination, a volume of transparent fluid, said volume being enclosed in part by a highly reflective cylindrical wall surface, means for directing a charged particle beam into said volume whereby the Cerenkov light produced by particles moving parallel to the longitudinal axis of said cylindrical volume with the same velocity form of a series of concentric Cerenkov light cones disposed symmetrically about said axis, a lens system for bringing said light cones into a ring focus, a photomultiplier tube, a diaphragm having a ring aperture disposed in front of the photosensitive cathode of said photomultiplier tube in the focal plane of said lens system whereby Cerenkov light from only those particles moving at said velocity can reach said photosensitive cathode.

9. A counter as defined in claim 8, means for varying the temperature and pressure of said fluid, thereby to change it from its gaseous to its liquid phase.

10. A differential Cerenkov counter comprising, in combination, a gaseous volume of transparent dielectric material, said volume being bounded by a cylindrical wall surface having a high coefficient of reflection, means for directing a charged particle beam into said dielectric whereby all particles moving with the same velocity $\beta$ in paths which are parallel to the longitudinal axis of said cylindrical volume create a series of concentric Cerenkov light cones disposed symmetrically about said axis, the median cone of said series having an apex angle equal to $2\theta$ where $$\cos\theta = \frac{1}{\beta n}$$

$n$ being the index of refraction of said dielectric, a photomultiplier tube, and means for illuminating the photosensitive cathode of said tube with said light cones.

11. In a counter as described in claim 10, means for changing the index of refraction of said dielectric material whereby particles of different velocities produce a series of Cerenkov light cones of substantially the same mean diameter.

12. In a counter as described in claim 10, wherein said transparent dielectric is a fluid kept near its critical temperature and pressure and means for controlling the temperature and pressure of said fluid thereby to convert it from its gaseous to its liquid phase.

13. A charged particle detector comprising, in combination, a volume of gaseous dielectric material, said volume being bounded by a cylindrical surface having a high coefficient of reflection, means for directing the charged particles which are to be detected into said cylindrical volume along and parallel to its axis of symmetry whereby those particles whose velocities in said material exceed that of light within said material produce Cerenkov radiation, means for changing the temperature and/or pressure of said gaseous material, and means for providing an indication of the intensity of said radiation.

References Cited in the file of this patent

UNITED STATES PATENTS

| | | |
|---|---|---|
| 2,448,963 | Dicke | Sept. 7, 1948 |
| 2,683,813 | Friedman | July 13, 1954 |
| 2,739,242 | Armistead | Mar. 20, 1956 |
| 2,954,473 | Hoover et al. | Sept. 27, 1960 |
| 2,971,092 | Rickard | Feb. 7, 1961 |

OTHER REFERENCES

Cerenkov Radiation, by Collins and Reiling in the October 1, 1938, Physical Review, page 499 et seq.

Northrop et al.: Los Alamos Gas Counters, Nucleonics, April 1956, pp. 36 and 37.

Sayres et al.: Gas Scintillation Counter, Review of Scientific Instruments, October 1957, pp. 758 to 764.